United States Patent [19]

Harper et al.

[11] 4,308,240

[45] Dec. 29, 1981

[54] RECOVERY OF COBALT AND MANGANESE FROM ASH OF RESIDUE FROM MANUFACTURE OF TRIMELLITIC ACID BY ACID EXTRACTION

[75] Inventors: Jon J. Harper, Naperville; Stephen J. Pietsch, Oak Park, both of Ill.

[73] Assignee: Standard Oil Company (Indiana), Chicago, Ill.

[21] Appl. No.: 218,062

[22] Filed: Dec. 19, 1980

[51] Int. Cl.³ .................... C01G 51/08; C01G 45/00
[52] U.S. Cl. .................................... 423/150; 423/49; 423/50; 423/140; 423/151; 75/109; 75/119; 252/412; 252/413; 252/414
[58] Field of Search .................... 75/109, 119; 252/412–414; 423/49, 50, 150–152, 140

[56] References Cited

U.S. PATENT DOCUMENTS

| | | | |
|---|---|---|---|
| 2,829,170 | 4/1958 | Moore | 75/109 |
| 3,105,851 | 10/1963 | Knobloch et al. | 252/413 |
| 3,341,470 | 9/1967 | Hensley | 252/412 |
| 3,673,154 | 6/1972 | Trevillyan | 423/140 |
| 3,880,920 | 4/1975 | Wampfler | 423/140 |
| 3,940,470 | 2/1976 | Kane et al. | 75/109 |
| 3,956,175 | 5/1976 | Shigeyasu et al. | 423/50 |
| 4,228,091 | 10/1980 | Partenheimer | 423/140 |

FOREIGN PATENT DOCUMENTS 194774  12/1967  U.S.S.R. .................... 252/413

*Primary Examiner*—Herbert T. Carter
*Attorney, Agent, or Firm*—Fred R. Ahlers; William T. McClain; William H. Magidson

[57] ABSTRACT

Cobalt and manganese are recovered from incineration ash obtained by combustion of residue from the manufacture of trimellitic acid and its recovery as 4-carboxyphthalic anhydride and then the recovered cobalt is separated from the recovered manganese by magnetic separation. The foregoing is accomplished by extraction of the ash with an aqueous solution of hydrogen bromide or chloride, recovery of the extract solution, and the upward adjustment of its pH while adding powdered manganese to precipitate metallic cobalt for its separation by magnetic means.

7 Claims, No Drawings

RECOVERY OF COBALT AND MANGANESE FROM ASH OF RESIDUE FROM MANUFACTURE OF TRIMELLITIC ACID BY ACID EXTRACTION

This invention relates to the separate recovery of cobalt and manganese catalyst metals from ash of the incinerated residue from the manufacture of trimellitic acid by oxidation of liquid pseudocumene. More particularly, the present invention effects such separate recovery through extraction of the ash with a hydrogen halide acid, pH adjustments of the extract solution to remove contaminant iron, if present, and pH adjustment while precipitating metallic cobalt by replacing its ions with ions from metallic manganese followed by magnetically separating metallic cobalt from the solution of manganese ions.

STATE OF THE ART

No publication has been found which discloses or suggests the foregoing steps of acid extractions, pH adjustment and magnetic separation for the separate recovery of cobalt and manganese from the ash of incinerating residue from the manufacture of trimellitic acid.

Acid extraction of ashes from incineration of residues from the manufacture of aromatic di- and tricarboxylic acid may well be known, especially extraction with sulfuric acid. Selective iron precipitation from an aqueous acidic solution also containing ions of cobalt and manganese may be known when the acidic solution is that of the acetates of iron, cobalt and manganese and such precipitation is caused by pH adjustment of the acidic solution. Also the replacement of cobalt ions by manganese ions from dissolved metallic manganese may be known. But it was not before known to extract the incineration ash of trimellitic acid process residue with a hydrogen halide acid, especially hydrobromic or hydrochloric acid, then by pH adjustment cause precipitation of iron, if present, and at least cobalt as metallic cobalt by having metallic manganese present during the pH adjustment to precipitate cobalt and then separate cobalt from the solution containing manganese ions by magnetic means.

BACKGROUND OF THE INVENTION

It is important to the manufacture of trimellitic acid by the catalytic oxidation of liquid pseudocumene with a source of molecular oxygen (e.g., air) to have cobalt, the most expensive metal oxidation catalyst, recovered and recycled to the liquid phase oxidation. For the liquid phase oxidation of methyl-substituted benzenes in general, it is known that the use of manganese with cobalt as the catalyst metal enhances the production of the benzene carboxylic acid, especially when bromine is the oxidation promoter, more than the sum of the effects of cobalt or manganese alone with bromine. Cobalt has the highest activity of the two metals. Cerium can be used with or to replace part of the cobalt without any loss of the activity due to cobalt especially for the oxidation of liquid pseudocumene to trimellitic acid. But, for such oxidation of pseudocumene to maximize trimellitic acid production and minimize co-production of methylsubstituted phthalic acids (partial oxidation products) as difficultly removable impurities, the manganese component of the Co-Mn-Br or Co-Ce-Mn-Br systems of catalysis is either not added at the start of the oxidation of pseudocumene when all of the cobalt is added or only a portion of the manganese is added at that time. According to U.S. Pat. No. 3,491,144, the addition of manganese is delayed until 50 to 55 percent of the oxidation is complete (i.e., 2 to 2.5 moles of oxygen consumed per mole of pseudocumene) and then manganese is added for its oxidation-enhancing ability. Also, according to U.S. Pat. No. 3,683,016, a portion of the manganese is used initially with cobalt and some of the cerium and the remainder of the manganese and cerium are added to distinct, separately operated oxidation steps, for example, one or two additional steps (a total of two to three steps) operated in series sequence. In such a process the amount of manganese and cerium added to each step is equal to the reciprocal of the total number of steps used.

Thus, to take advantage of the benefits of such staged addition of manganese and still be able to recover and reuse the expensive cobalt component of catalysis for the pseudocumene oxidation, it is important to be able not only to recover cobalt from a residue of the manufacture of trimellitic acid but also to be able to separate cobalt from manganese also so recovered. Such recovery and separation of cobalt and manganese can be accomplished by the inventive method to be next defined and described.

SUMMARY OF THE INVENTION

We have devised a novel method of recovery of cobalt and manganese from a residue of trimellitic acid manufacture and the separation of recovered cobalt from recovered manganese. Said method is a combination of the steps of incinerating said residue; extracting the resulting incineration ash with an aqueous solution of a hydrogen halide, preferably an aqueous solution of hydrogen chloride or hydrogen bromide, which converts most of the metal oxides present to their water soluble halides, preferably chlorides or bromides; separating the acidic aqueous solution of metal halides from insolubles; increasing the pH of the separated solution first to a pH of 3 to 4 if iron be present to precipitate iron hydroxide or oxide for discard but at least to a pH of 5.5 to 6 while adding powdered manganese to the pH-adjusted solution to displace cobalt ions therefrom as metallic cobalt precipitate; and removing the precipitated metallic cobalt by magnetic separation thereby effecting separation of recovered cobalt from recovered manganese.

It would appear from theoretical concepts that any form of metallic manganese could be used in the displacement of cobalt ions and precipitation of metallic cobalt. However, forms of manganese having low ratios of surface area to unit mass in such forms as ribbons, wire, rods, bars, sheet, etc., of manganese do initiate displacement of cobalt ions from solution by added manganese ions and formation of metallic cobalt does occur with such low surface:mass forms. But such displacement becomes retarded and finally ceases because metallic cobalt plates out on the surfaces of such forms. To be commercially effective and feasible inordinately large amounts of such forms of manganese would have to be present. Even then, redissolving the displaced and precipitated cobalt would also cause dissolution of the manganese base. Powdered manganese with its rather high surface to mass ratio does not suffer such disabilities because even though there be used more than one chemical equivalent of manganese per chemical equivalent of cobalt to be displaced and precipitated, plating of cobalt on manganese particles does not cause retardation to cessation of cobalt displacement and precipitation.

The upward adjustment of pH of the acidic aqueous solution of metal chlorides or bromides can be effected with any alkaline material which does not also precipitate all of the dissolved metals and preferably does not precipitate a mixture of cobalt and manganese compounds. Sodium, potassium or ammonium hydroxides can be used for the indicated pH adjustments. Ammonium hydroxide used for such pH adjustments does not add to the problem of solids disposal after manganese separation from the last pH-adjusted solution.

Following separation of metallic cobalt precipitate by magnetic separation, the cobalt metal is redissolved to put it into a form reusable as the source of cobalt catalyst component for the manufacture of trimellitic acid by air oxidation of liquid pseudocumene. It is preferred to effect such dissolution of cobalt by the use of hydrobromic acid because the resulting solution of cobalt-(ous) bromide can be used initially in said oxidation to supply both the cobalt and bromide components of catalysis.

The solution of manganese coming from the magnetic separation of metallic cobalt can be treated with a sodium, potassium or ammonium carbonate or bicarbonate to precipitate manganese carbonate. Then manganese carbonate precipitate, after separation from the aqueous solution, is redissolved as its acetate or bromide, preferably as the acetate, for reuse in the staged addition of manganese for the manufacture of trimellitic acid from pseudocumene.

The temperatures for the conduct of the foregoing steps of recovery and separation of cobalt and manganese are not critical. Rather such temperatures are selected which expeditiously and efficiently effect the function of the steps for the needs of commercial practice and without undue waste of energy.

Iron may be present in the residue of trimellitic acid manufacture because of corrosion of elements of processing apparatus fabricated from iron-containing alloys.

The following TABLE I provides examples of analyses of residues from the manufacture of trimellitic acid (TMLA) per se or its acid anhydride (TMA). Said analyses do not account for the anion of the catalyst metals nor do they account for corrosion metals. Analyses showing a more complete accounting of catalyst and corrosion (Fe) metals are later provided.

TABLE I

CHARACTERIZATION OF RESIDUES FROM THE MANUFACTURE OF TRIMELLETIC ACID AND ANHYDRIDE

| Component, In Weight % | RESIDUE | |
|---|---|---|
| | TMLA | TMA |
| Acetic Acids | 1.58 | 0 |
| Phthalic Acids | 12.3 | 1.0 |
| Toluic Acids | 0 | 0 |
| Aldehydes | 0.53 | 1.4 |
| Benzoic Acid | 0.5 | 0 |
| Trimellitic Acid | 38.6 | 65.2[1] |
| OLB Compounds[2] | 4.7 | 1.9 |
| HB Compounds[3] | 0.94 | 0.4 |
| Cobalt | 1.17 | 2.51 |
| Manganese | 0.28 | 0.87 |
| Bromine | 0.94 | 0.15 |

[1]Trimellitic acid anhydride
[2]"OLB Compounds" are other lower boiling compounds.
[3]"HB Compounds" are higher boiling (higher than trimellitic acid) compounds.

TABLE II

| CATALYST AND CORROSION (Fe) METALS CONTENT OF TMA PROCESS RESIDUES | | | |
|---|---|---|---|
| Co | Fe | Mn | Ce |
| 1.19 | 0.05 | 0.71 | 0.69 |
| 0.77 | 0.05 | 0.37 | 0.16 |

The following example illustrates the presently believed best mode of conduct of the present invention including its extension to redissolving the separated and recovered cobalt and manganese for their recycle to the manufacture of trimellitic acid by the catalytic oxidation of liquid pseudocumene with air.

Residue for the following example is obtained from the manufacture of trimellitic acid and its recovery as its acid anhydride (4-carboxyphthalic anhydride) by the oxidation of liquid pseudocumene with air in the presence of acetic acid (2.4 wt. parts per 1.0 weight part pseudocumene) in three steps wherein all of the cobalt, 30 percent of the manganese and 33% of the cerium (total metals is 0.22 wt.% of pseudocumene) are added to the first step with a source of bromine providing 0.8 wt.% bromine on pseudocumene dissolved in the acetic acid. In each of the second and third oxidation steps 35% of the total manganese and 33% of the total cerium are added with additional bromine (0.125 wt.% of pseudocumene) again in acetic acid. The reaction temperatures for each step are 188° C., 205° C. and 227° C.

The reaction mixture from the third step (227° C. and 29 kg/cm² gauge pressure) is decompressed into a vessel maintained at 0.5 kg/cm² gauge pressure. Said vessel has a reflux condenser operated at a temperature 20° C. below the boiling temperature of trimellitic acid anhydride. Under such conditions acetic acid and by-product and most of the dehydration water are removed as vapors. The resulting impure trimellitic acid anhydride is pumped into a second vessel containing said anhydride at its melting point and having a reflux condenser operated at 125° C. The residence time in the second vessel is sufficient to complete the dehydration of trimellitic acid to its anhydride and drive off all the water of dehydration. Thereafter the impure trimellitic acid anhydride is pumped into an evaporator operated at a reduced (subatmospheric) pressure and a temperature to evaporate trimellitic acid anhydride. The liquid residue amounts to 2400 kg/hr.

EXAMPLES

The 2400 kg/hr of the above obtained liquid residue is pumped into an incinerator and the ash therefrom amounting to 200 kg/hr is collected and mixed with 0.4 kg/hr of hydrochloric acid (35% HCl). The mixture is heated to 82° C. at a residence time of two hours. The resulting slurry is filtered to remove insolubles which are discarded. The filter cake of insolubles is washed with water in a weight ratio of 1:1.

The wash water and filtrate are combined and mixed with 0.058 sodium hydroxide (25% NaOH) or 0.57 kg/hr ammonium hydroxide (23% NH₃) to increase the pH of the solution to a pH of 3.5 at which pH iron hydroxide forms and changes to iron oxide which precipitates. The resulting slurry is filtered to remove about 0.002 kg/hr iron oxide.

The second filtrate has its pH adjusted with ammonium hydroxide (about 0.001 kg/hr) to a pH between 5.5 and 6.0 while 032 kg/hr of powdered manganese is added. Metallic cobalt precipitates. The resulting slurry flows through an electromagnetic separator wherein 0.024 kg/hr cobalt is collected. The separated solution, about 0.609 kg/hr, contains 0.044 kg/hr manganese.

The collected cobalt is washed from the electromagnetic separator with water and combined with 0.136 kg/hr hydrobromic acid (48% HBr). The resulting solution contains 0.024 kg cobalt, 0.067 kg bromine and 0.069 kg water per hour.

To the 0.609 kg/hr solution containing 0.044 kg of manganese there is added 0.768 kg/hr of ammonium carbonate dissolved in water to precipitate the manganese as its carbonate. The 0.092 kg/hr manganese carbonate precipitate is removed by filtration, washed with 0.092 kg/hr of water and then added to 0.105 kg/hr aqueous acetic acid (45 wt. % water) and heated to 100° C. until the manganese carbonate is dissolved.

The invention claimed is:

1. The recovery of cobalt and manganese from a cobalt and manganese-containing residue of the manufacture of trimellitic acid and the separation of recovered cobalt from recovered manganese which comprises incinerating said residue, collecting the ash of said incineration, mixing the ash with hydrochloric or hydrobromic acid to dissolve the metals in said ash, adjusting the pH of the resulting solution of metal chlorides or bromides to a pH of at least 5.5 to 6 and while adding powdered manganese to precipitate metallic cobalt, and collecting the precipitated metallic cobalt with a magnetic separator.

2. The method of claim 1 wherein the residue also contains iron and the solution of metal chlorides first has its pH adjusted to a pH of 3 to 4 to precipitate iron oxide and then has its pH adjusted to a pH of 5.5 to 6 after removing the iron oxide precipitate.

3. The method of claim 2 wherein the pH adjustments are made by the addition of ammonium hydroxide.

4. The method of claim 2 wherein the ash is dissolved in hydrochloric acid.

5. The method of claim 4 wherein the pH adjustments are made with ammonium hydroxide.

6. The method of claim 4 wherein the collected cobalt is dissolved with hydrobromic acid.

7. The method of claim 4 wherein the solution separated from metallic cobalt is mixed with ammonium carbonate to precipitate manganese carbonate, separating the manganese carbonate precipitate, and the manganese carbonate is mixed with aqueous acetic acid to dissolve the manganese as its acetate.

* * * * *